Feb. 21, 1939.   B. R. REUSCHER ET AL   2,148,133
MOLDED CARBON ELECTRODE AND METHOD OF PREPARING THE SAME
Original Filed June 25, 1935

Benedict R. Reuscher
John M. Bennett
INVENTORS

BY John J. Rogan
ATTORNEY

Patented Feb. 21, 1939

2,148,133

UNITED STATES PATENT OFFICE 2,148,133

MOLDED CARBON ELECTRODE AND METHOD OF PREPARING THE SAME

Benedict R. Reuscher, St. Marys, Pa., and John M. Bennett, Passaic, N. J.; said Bennett assignor to Hygrade Sylvania Corporation, Salem, Mass., a corporation of Massachusetts Application June 25, 1935, Serial No. 28,250
Renewed December 22, 1937

17 Claims. (Cl. 250—27.5)

This invention relates to electrodes and with particularity to electrodes constituted of carbon prepared by an improved molding process.

Prior to the present invention electrodes for such devices as electron discharge tubes and the like have been constituted of metal or of graphite, and while the desirability of employing carbon electrodes was known, there was known no process of preparing the carbon, in suitable form, for this use. While carbon has been employed as an electrode in such devices as arc lamps, primary batteries and similar devices the conditions and requirements of operation of electron discharge tube electrodes or the like render such carbons entirely impractical. One of the chief reasons why ordinary carbons, and for that matter ordinary graphites, are unsuitable for use as discharge tube electrodes is that the known processes of making such carbon or graphite electrodes result in a product which lacks the required degree of hardness with the result that the surface of such an electrode is easily scratched. Even if the greatest care is employed in the handling of carbon electrodes produced by these known processes it is nevertheless still necessary to subject the electrode to a machining operation to bring it to the proper dimensions, and in this machining operation a certain per cent of loose surface carbon is unavoidably produced. This loose carbon in ordinary devices such as arc lamps, batteries and the like is not detrimental to the normal functioning of the electrode for such purposes, however the existence of even a small percent of loose surface carbon on an electron discharge tube electrode may render the tube unreliable.

Accordingly one of the principal objects of the present invention is to provide a carbon electrode which is eminently suited for use as an electrode in an electron discharge tube or the like.

Another object of the invention is to provide an improved method of manufacturing a carbon electrode by reason of which the necessity of machining the electrode to the desired dimensions is avoided.

In addition to the requirement that a discharge tube electrode be substantially free from loose surface carbon, is the equally important requirement that the dimensional configuration of the electrode be maintainable both during manufacture and during use and processing. One of the chief reasons why carbon has not found any extensive use as a discharge tube electrode, is that when subjected to the usual heat treatment either during manufacture or final processing, there results a shrinkage in size, which shrinkage is not sufficiently accurately controllable with ordinary processes to meet the stringent requirements of discharge tube practice.

Accordingly another principal object of this invention is to provide a method of manufacturing a carbon electrode whereby the dimensional configuration of the finished electrode may be accurately controlled and within very narrow limits.

Another object is to provide a method of manufacturing hollow, tubular or similar non-solid carbon electrodes whereby the necessity of machining or similarly shaping and dimensioning the electrode is avoided.

A feature of the invention relates to an improved method of molding a carbon body having sufficient surface hardness and dimensional accuracy to render it suitable for use in discharge tubes and the like.

Another feature relates to a method of molding a carbon body at relatively low molding pressure to produce a finished product having very great hardness.

Another feature relates to a method of preparing and molding carbon whereby relatively thin-walled hollow or tubular members may be produced having great hardness and uniform dimensions, rendering them particularly suitable for use as electrodes in electron discharge tubes and the like.

A further feature relates to an improved carbon mix for manufacturing molded carbon articles with relatively high dimensional accuracy.

A further feature relates to an improved method of preparing a molded carbon body by confining the molding pressure and molding temperature within specially chosen limits.

A further feature relates to an improved method of preparing a molded carbon body by confining the drying time of the molding mix within specially chosen limits.

A still further feature relates to the novel organization and succession of steps which go to make up an improved molded carbon electrode and method of manufacturing the same.

Other features and advantages not specifically enumerated will be apparent after a consideration of the following detailed descriptions of preferred procedures and the appended claims.

While the invention will be described herein as applied to the manufacture of an electrode for such devices as electron discharge tubes it will be understood that the novel process according to the invention is equally well applicable to the manufacture of other similar bodies, particularly those bodies whose hardness, purity and dimensional accuracy are a sine qua non of practical commercial use. In the drawing, Fig. 1 is a diagrammatic curve showing the preferred range of meshes of carbon to be used accordingly to the invention.

The important characteristics which distinguish an electrode produced according to this invention from the usual type of carbon electrode are as follows. In the first place the molded electrodes according to this invention are hard and mechanically strong, and therefore do not flake off when handled, nor do they disintegrate in the discharge tube under the strong electrostatic fields encountered with high electrode voltages. We have found that voltages approximately fifty times higher than those permissible with ordinary carbon or graphite electrodes are successfully withstood by the present electrodes for a given heat dissipation. In one instance observed, the permissible voltage increase to obtain the same degree of disintegration was from 3000 volts per centimeter separation of the electrodes, to 140,000 volts per centimeter separation. This resistance to disintegration is due in part to the smooth and very hard exterior of the molded electrode, which hardness is obtained during the molding operation and the electrode remains unbroken when one or more support wires are molded therein, since the said wires may be firmly molded into the carbon body during the original molding operation, thus making unnecessary the machining or drilling of the finished article.

In the second place the carbon electrodes are given, during the molding process, sufficiently uniform dimensions as to make unnecessary any further cutting or machining to size.

Thirdly, the thermal emissivity is comparable to that of graphite even when the surface of the molded electrode is smooth because of the greater blackness of the carbon electrode than the graphite electrode.

Fourthly, because of the higher density of the molded electrode and the intimate contact between the particles, the heat conductivity is higher than that of graphite, resulting in a better heat transfer from the collecting to the radiating surfaces of the electrode.

Fifthly, when the molded carbon electrode has the support wire or wires imbedded therein during the molding operation, the small shrinkage of the electrode during the final bake is sufficient to tightly bond the wire in place, but is insufficient to produce strains of rupturing magnitude in the body of the electrode surrounding the wire. As a result we have found that it is unnecessary to choose a wire having the same thermal expansion coefficient as the carbon.

Figure 1:
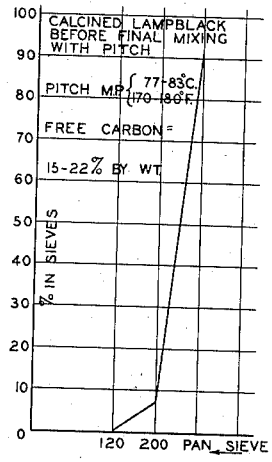

We have found that by properly choosing the various factors which enter into the molding operation such as mesh of the original carbon, mesh of the green "mix", molding temperature, molding pressure, drying time of the "mix", it is possible to produce carbon electrodes having the above noted and other desirable characteristics which render them particularly suitable for use in electron discharge tubes and the like. Thus one preferred procedure that has been found to produce the desired results employed the carbon in the form of calcined lamp black flour mixed with a pitch binder in the proportions by weight of approximately 66 per cent lamp black to approximately 34 per cent pitch. Preferably the lamp black is of a degree of fineness as shown by the curve of Fig. 1 wherein the abscissae represent various size meshes, and the ordinates represent the per cent of lamp black passed through the corresponding mesh. From this curve it will be seen that all lamp black coarser than approximately 120 mesh is discarded while the greater per cent of the lamp black is above 200 mesh. We have found that the best results are obtained by using a lamp black flour approximately ninety per cent of which is finer than 200 mesh as shown in Fig. 1.

Figure 2:
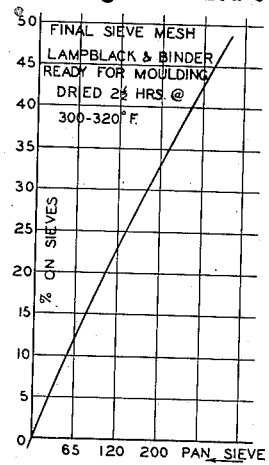
Fig. 2 is a curve showing the preferred range of meshes of the carbon and binder mix according to the invention.

While any well known form of carbonaceous binder may be employed, we prefer to employ a pitch binder having a melting point within a specially chosen range and having a free carbon content within a certain range. One grade of binder that has been found successful for the purpose had a melting point of between 77 and 83 degrees centigrade and a free carbon content of between 15 and 22 per cent by weight. Other grades of pitch may be employed having higher or lower melting points than those above specified provided appropriate allowance is made for the drying time of the mix as pointed out hereinbelow. The mixture of lamp black and pitch is preferably extruded to form ingots which are subsequently crushed and ground to small particle size. The ground mix is then screened and that portion which shows a screen analysis as represented by the curve of Fig. 1 is used to make up the final molding mix. This final molding mix is prepared by mixing a pitch having a melting point preferably between 77 and 83 degrees centigrade and a free carbon content of between 15 and 22 per cent by weight, together with a quantity of the ground mix according to Fig. 1 and which has been previously "coked" by cooking at approximately 2000 degrees Fahrenheit in a suitable non-oxidizing atmosphere. This second mix is formed by combining 34 per cent pitch by weight, and approximately 66 per cent by weight of the ground "coked" material, and is ground to small size in a ball mill or the like and subsequently screened to mesh size in accordance with the relation shown in the curve of Fig. 2. This screened mix may then be dried in an oven at a temperature preferably between 300 and 320 degrees Fahrenheit for a length of time varying preferably between 2 and 2½ hours depending upon the molding pressure and temperature to be used as described hereinbelow. We have found that the drying time is of great importance particularly where relatively thin walled hollow electrodes are to be molded, because it is necessary that the mix have the proper degree of flowability to completely fill all the necessary interstices of the mold at the range of molding pressures required. When a drying time of approximately 2 to 3½ hours is employed with the type of mix described, the material loses from about 0.195 per cent to about 0.390 per cent of its weight, probably from the binder volatiles. This small change influences to a marked degree the running or mold filling qualities of the mix, which in turn is of importance, as pointed out above, in filling small crevices in the dies for complicated or thin-walled shapes. With the particular proportion of carbon and binder described we have found that a drying for less than 2 hours makes too sticky a mix to load a small die properly, while drying for more than 3½ hours makes necessary a higher die temperature to insure that the piece is mechanically strong and free from "graininess". Subjecting the mix to a drying time of more than three hours also increases the tendency of the piece to laminate or split at the higher molding pressures. However it will be understood that relatively slight variations one way or the other may be made in the drying time depending upon the variations in the character of the binder.

Figure 4:
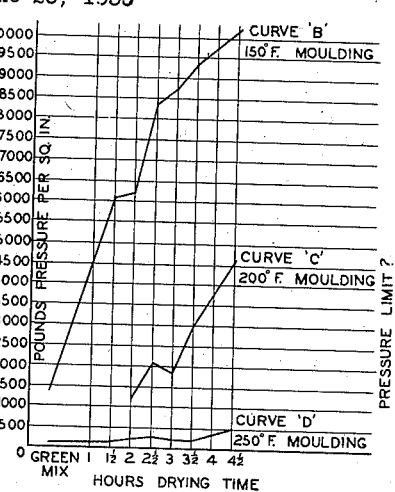
Fig. 4 shows a family of curves to illustrate the preferred relation between molding temperature, molding pressure and "mix" drying time.
Figure 3:
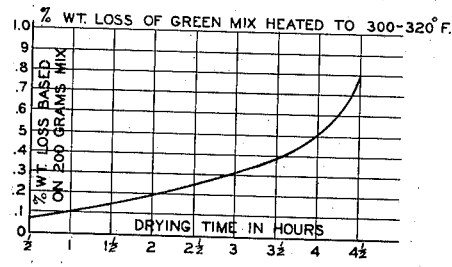
Fig. 3 is a curve showing the preferred range of "mix" drying times.

The properly dried final mix is flowed into a mold or die of the desired shape and subjected to the proper amount of pressure and molding temperature. Thus Fig. 4 shows practical die temperatures, pressures and mix drying times to produce finished electrodes of the proper shape and having a density between 1.35 and 1.50. Referring to Fig. 4 it will be seen that for a mix drying time of between 2 and 3½ hours and a die temperature of approximately 150 degrees Fahrenheit, the pressures required to produce the proper density in the finished electrodes vary from 6200 pounds per sq. in., for the shorter drying time, to 9300 pounds per sq. in., for the 3½ hour material. From an inspection of Fig. 4 it will be seen that there is a considerable effect of the die temperature on the amount of molding pressure required. Curve "B" shows the variation of die pressure required at a molding temperature of approximately 150 degrees Fahrenheit; curve "C" shows a similar relation with a die temperature of approximately 200 degrees Fahrenheit; while curve "D" shows the relation at a die temperature of approximately 250 degrees Fahrenheit. From curves "C" and "D" it will be seen that an increase of only 50 degrees reduces the pressure range by approximately 5000–6000 pounds per sq. in., and that for a die temperature of 250 degrees Fahrenheit (curve "D"), the pressure required is only about 250 pounds per sq. in. Entirely apart from the simplification and increased life of the dies necessary for this lower molding pressure, we have found that a more accurate and controllable procedure can be employed. Thus to produce an electrode of the required density with a relatively cold mold would require pressures in excess of 10 tons per sq. in.

Figure 7:
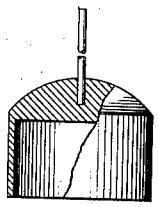
Fig. 7 is a view partly in cross section showing one form of electrode produced according to the invention.
Figure 8:
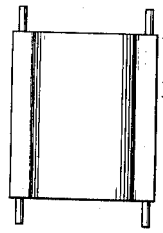
Figs. 8 and 9 show another form of electrode produced according to the invention.
Figure 9:

Various metal rods or inserts may be molded firmly into the carbon body, the die appropriately recessed to hold the rods or inserts in the proper position while molding. Figs. 7 to 9 show typical electrodes and support wires that may thus be produced. As pointed out hereinabove it is unnecessary, because of the large ratio of material strength to rupturing stresses and also to the small shrinkage of the carbon material when baked, to roughen, corrugate or otherwise specially shape the insert, the sole requirement being that the insert material be refractory enough to withstand the baking or subsequent degassing temperatures to which the pieces may be subjected. Wires, tubes, rods or other shapes of nickel, iron, molybdenum or their alloys may be successfully molded in place to form mechanical supports or current lead-in wires.

After the piece is removed from the mold it is fired preferably in a reducing atmosphere to a temperature of approximately 2000 degrees Fahrenheit to expel volatiles and to further harden the piece. We have found that during this firing operation the temperature should be raised gradually from 100 degrees centigrade to 600 degrees centigrade to prevent the formation of blisters or gas pockets, because large quantities of hydrocarbon gases are evolved in this temperature range. For electrodes of the sizes and shapes such as are ordinarily employed in electron discharge tubes, a temperature rise of approximately 40 degrees Fahrenheit per hour has been found to produce satisfactory results. It is also preferred to pack the pieces in sawdust or granulated carbon during this heat treatment to prevent deformation, because the pieces may soften sufficiently to collapse of their own weight while passing through the temperature range between 150 and 350 degrees centigrade. When the pieces have reached approximately 600 degrees centigrade, the majority of the volatiles have been driven off and the temperature may be raised somewhat more rapidly to 1000 degrees centigrade or more for final hardening.

Figure 5:
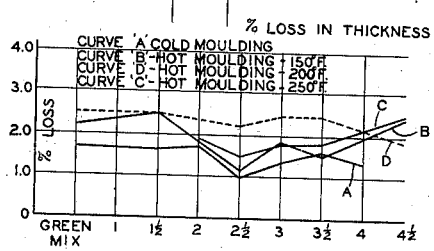
Fig. 5 is a series of curves showing the relation between "mix" drying time and per cent loss of thickness at various molding temperatures.
Figure 6:
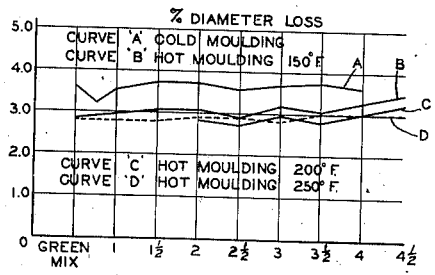
Fig. 6 is a series of curves showing the relation between "mix" drying time and per cent diameter loss at various molding temperatures.

During the above described baking or firing operation the pieces shrink from 2½ to 4 per cent in a direction at right angles to the molding pressure and from 1½ to 2½ per cent in the direction of the molding pressure. Figs. 5 and 6 show the variation in thickness and diameter to be expected with different drying times and die temperatures using the pitch binder described above. After the necessary firing, the pieces may be subjected to further degasification, if necessary, by heating them to a higher temperature either in hydrogen or in vacuum. In this respect the same procedure may be employed as is employed in vacuum tube processing. Thus the piece may be heat treated in hydrogen at approximately 2000 degrees centigrade for 3 to 5 minutes, depending on the thickness of the piece. During this latter treatment no appreciable changes in dimensions occur and usually no other degassing treatment is required, the electrode being assembled into the electron discharge tube which may be exhausted or filled with an inert gas, vapor or mixture of gas and vapor as is well known in the discharge tube art.

We have found that when a molded carbon electrode is produced by the above described procedure that it shows a Scleroscope hardness of approximately 70, as against approximately 40 for graphite, consequently the electrode material does not readily abrade nor is it readily scratched, and furthermore is substantially free from carbon dust on its exterior. The finished electrode does not smudge and may be handled quite roughly without injury. The hardness of the finished electrode has been found adequate to insure that no appreciable disintegration of the electrode surface occurs when the electrode is subjected to an electrostatic field as high as 100,000 volts per centimeter, thus rendering it remarkably useful in high voltage tubes, such for example as high voltage rectifier tubes, high voltage or high power radio transmitting tubes and the like, fields in which ordinary carbon or graphite electrodes are unsuitable due primarily to the ease of disintegration of ordinary carbon or graphite electrodes in the high potential fields.

While the invention has been described in connection with the making of electrodes for electron discharge tubes it will be understood that the procedure is equally well applicable to the making of electrodes or parts for any electrical apparatus where very great surface hardness, carbon content purity, very low shrinkage, dimensional accuracy and freedom from carbon dust are desiderata. Furthermore while specific proportions, pressures and temperatures have been mentioned herein, they are susceptible of variation to a certain extent without departing from the spirit and scope of the invention. For example, while the preferred quantity of binder is 34% by weight this per cent can be varied between 25% and 40% with desirable results.

What is claimed is:

1. The method of making a carbon body with a hollow tubular portion consisting for the most part of amorphous carbon which includes the steps of mixing carbon flour of sufficient fineness with a pitch binder to produce a flowable molding mix, drying the mix for appproximately two to three-and-one-half hours, and molding the dried mix at a molding pressure of from 200 to 9500 pounds per sq. in., and at an average molding temperature of between 250 and 150 degrees Fahrenheit.

2. The method of making a carbon body with a hollow tubular portion consisting for the most part of amorphous carbon which includes the steps of mixing carbon flour with a pitch binder to produce a flowable molding mix, drying the mix for approximately two to three-and-one-half hours, and molding the dried mix at a molding pressure of from 200 to 3000 pounds per sq. in., at a molding temperature of between 250 and 200 degrees Fahrenheit.

3. The method of making a carbon body with a hollow tubular portion consisting for the most part of amorphous carbon which includes the steps of mixing carbon flour with a pitch binder to produce a flowable molding mix, drying the mix for approximately two to three-and-one-half hours, and molding the dried mix at a molding pressure of the order of 250 pounds per sq. in., and at an average molding temperature of the order of 250 degrees Fahrenheit.

4. The method of making a carbon body with a hollow tubular portion consisting for the most part of amorphous carbon which includes the steps of mixing carbon flour with a pitch binder and grinding to produce a molding mix having the greater part of its particle sizes consisting of 200 or finer mesh, drying the mix for approximately two to three-and-one-half hours, and molding the dried mix at a molding pressure of between 200 and 500 pounds per sq. in., and at a molding temperature of the order of 250 degrees Fahrenheit.

5. The method of making a carbon body with a hollow tubular portion consisting for the most part of amorphous carbon which includes the steps of mixing calcined lamp black flour with a pitch binder and grinding to produce a molding mix having the greater part of its particle sizes consisting of 200 or finer mesh, drying the mix for approximately two to three-and-one-half hours, and molding the dried mix at a molding pressure of between 1200 and 3000 pounds per sq. in., and at a molding temperature of the order of 200 degrees Fahrenheit.

6. The method of making a carbon body with a hollow tubular portion consisting for the most part of amorphous carbon which includes the steps of mixing calcined lamp black flour with a pitch binder and grinding to produce a molding mix consisting for the greater part of 200 or finer mesh, drying the mix for approximately two to three-and-one-half hours, and molding the dried mix at a molding pressure of between 6000 and 9500 pounds per sq. in., and at a molding temperature of the order of 150 degrees Fahrenheit.

7. The method of making a carbon body consisting substantially entirely of amorphous carbon and having a surface hardness of the order of approximately 70 Scleroscope which includes the steps of mixing carbon flour and pitch binder in the proportions of approximately 34% pitch to approximately 66% lamp black, drying the mix for approximately two to three-and-one-half hours, flowing the dried mix into a suitable mold, and subjecting the mix in the mold to a molding pressure of between 250 and 9500 pounds per sq. in., and at an average molding temperature of between 250 and 150 degrees Fahrenheit.

8. The method according to claim 7 in which the pitch binder has a melting point of between 170 and 180 degrees Fahrenheit.

9. The method according to claim 7 in which the pitch binder has a melting point of between 170 and 180 degrees Fahrenheit, and a free carbon content of 15 to 25%.

10. The method according to claim 7 in which the mix is dried at a temperature of the order of 300 degrees Fahrenheit.

11. The method of making a molded carbon electrode having a portion in the form of a hollow thin-walled tube of amorphous carbon which includes the steps of, mixing comminuted carbon with a pitch binder having a melting point of the order of 175 degrees Fahrenheit, grinding and sieving the mixture, until the greater part is of 200 or finer mesh, drying the ground mixture at a temperature of between 300 and 320 degrees Fahrenheit, and molding the dried mixture at a molding pressure of between 200 and 9300 pounds per sq. in., in a heated mold to produce an electrode density of between 1.35 and 1.50.

12. The method of making a molded carbon electrode having a portion in the form of a hollow thin-walled tube of amorphous carbon which includes the steps of, mixing, comminuted carbon with a pitch binder in the ratio of approximately 34% pitch to approximately 66% carbon, grinding and sieving the mixture until the greater part is of 200 or finer mesh, drying the sieved mixture at a temperature of between 300 and 320 degrees Fahrenheit, and molding the dried mixture at a temperature of between 150 and 250 degrees Fahrenheit to produce an electrode density of between 1.35 and 1.50.

13. The method according to claim 12 in which the carbon is calcined lamp black, and the pitch binder has a melting point of between 170 and 180 degrees Fahrenheit having a free carbon content of between 15 and 22%.

14. The method of making a molded carbon electrode consisting substantially entirely of amorphous carbon which includes the steps of mixing lamp black flour with a pitch binder, forming the mixture into ingots, comminuting the ingots, coking the comminuted ingots at about 2000 degrees Fahrenheit in a non-oxidizing atmosphere, mixing the coked comminuted ingots with a pitch binder having a free carbon content of the order of 15 to 22% to produce a molding mix, grinding the molding mix until the greater part thereof is of 200 or finer mesh, drying the ground molding mix for approximately two to three-and-one-half hours, and then molding the dried mix at a temperature of between 150 and 250 degrees Fahrenheit.

15. The method according to claim 14 in which the molded electrode is fired in a reducing atmosphere to a temperature of about 2000 degrees Fahrenheit.

16. The method according to claim 14 in which the molded electrode is fired in a reducing atmosphere and the temperature is raised slowly while the electrode is in the plastic state, and then the temperature is raised relatively rapidly.

17. A carbon electrode for electron discharge devices formed from a mixture of calcined lamp black and pitch in the ratio of approximately 34% pitch to approximately 66% lamp black and molded to a density of between 1.35 and 1.50.

JOHN M. BENNETT.
BENEDICT R. REUSCHER.